March 15, 1966     A. V. WEASLER     3,240,519
QUICKLY DETACHABLE CONNECTION FOR COUPLED SHAFT SECTIONS
Filed Sept. 26, 1962
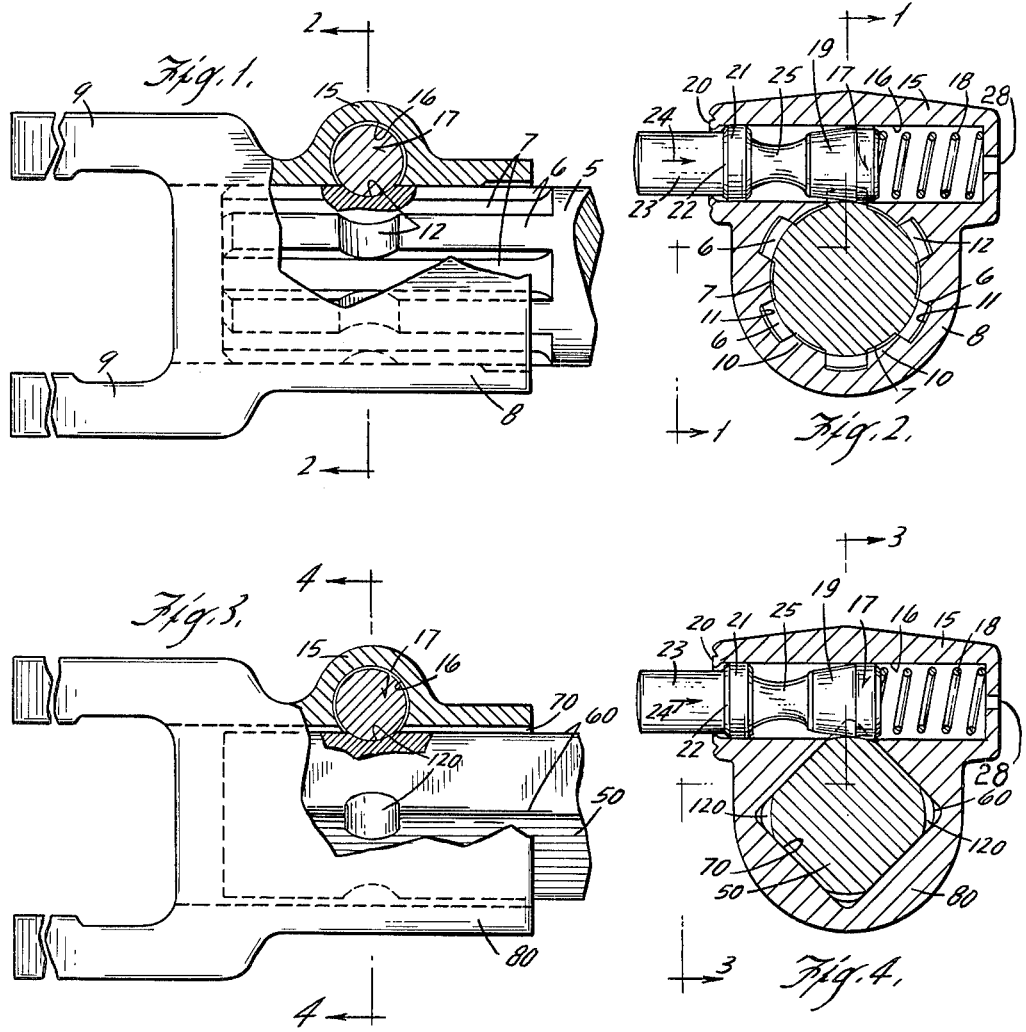
INVENTOR.
ANTHONY V. WEASLER
BY
Wheeler, Wheeler & Wheeler
ATTORNEYS.

United States Patent Office 3,240,519
Patented Mar. 15, 1966

3,240,519
QUICKLY DETACHABLE CONNECTION FOR
COUPLED SHAFT SECTIONS
Anthony V. Weasler, 603 Ridge Road, West Bend, Wis.
Filed Sept. 26, 1962, Ser. No. 226,262
1 Claim. (Cl. 287—119)

This invention relates to a safety lock pin for coupled shaft sections.

In power transmission shafts used in agricultural machinery and elsewhere, it is important to be able to make and release shaft connections instantly and safely and without tools. The shaft sections to be coupled are non-circular, being splined or squared, and the pin with which the invention is concerned releasably holds the sections against accidental separation.

In one embodiment shown, at least one peripheral channel is cut into splines. In another embodiment, the non-circular cross section of the inner shaft element is square and the peripheral channel is cut into the corners of the square. In both constructions, the dowel comprises a cylindrical portion fitting a blind bore in which it is reciprocable and urged by a spring to a position in which a tapered surface of the dowel seats in the channel segment in the spline or corner of the inner shaft element, thus locking the inner shaft element in place. A push button connected with the dowel by means of a neck of limited radius enables the dowel to be displaced against the bias of the spring. When the reduced neck registers with the spline or corner of the inner shaft element, there is nothing to obstruct the free movement of such inner shaft element to and from the complementary socket of the outer shaft element.

In addition to a reduction in cost, the improved construction has a major advantage in that a very considerable degree of hazard in the use of the device is eliminated. The push button is the only projecting part, the bore being sufficiently closed to provide a spring seat at the blind end opposite the push button and the retention of the dowel being achieved by swaging or staking which engages a shoulder with which the dowel is provided near the push button.

The push button-controlled dowel may be used as a replacement in existing equipment by staking operation or the like to hold the dowel in place, thereby eliminating hazardous pins or x washers previously used.

In the drawings:

FIG. 1 is a view partially in side elevation and partially in axial section on line 1—1 of FIG. 2 showing a connection between the inner and outer shaft elements according to the present invention.

FIG. 2 is a view taken in cross section on the line 2—2 of FIG. 1.

FIG. 3 is a view similar to FIG. 1 showing a modified embodiment of the invention.

FIG. 4 is a view taken in cross section on the line 4—4 of FIG. 3.

In both embodiments shaft elements detachably connected comprise an inner shaft element and a tubular outer shaft element, the latter being the hub of a yoke such as is used in a universal joint. In FIG. 1, the inner element comprises a shaft 5 having axial splines 6 defined by slots 7 opening to the end of the shaft.

The outer shaft element comprises the yoke hub 8 which, merely by way of exemplification, has integral arms 9. Interiorly, the hub 8 has splines 10 complementary to the channels 7 of the inner shaft element 5 and it has spaces 11 complementary to the splines 6 of the inner shaft element.

The segments 12 of a peripheral channel have been cut in splines 6 of the inner shaft element. The outer shaft element 8 has a boss 15 provided with a transverse bore 16 tangential to at least one of the channel segments 12. The dowel 17 reciprocable in bore 16 is biased by compression spring 18 to a position in which the tapered portion 19 of the dowel wedge in engagement with that channel segment 12 which is intersected by the bore 16. With the dowel positioned as shown in FIG. 2, the shaft elements 5 and 8 are securely coupler against axial separation (for rotative purposes, they are, of course, coupled by the splines).

Spring 18 may bear directly against the end of bore 16. At its other end, the bore 16 is swedged or staked to reduce its diameter at 20 to provide a stop abutted by the annual dowel flange 21, which fits the bore. Flange 21 has a shoulder 22 beyond which projects a reduced radius 23 of the dowel, this serving as a push button for displacing the dowel against the bias of spring 18. When the dowel is thus displaced by pushing the projecting button 23 in the direction indicated by arrow 24, the reduced neck 25 of the dowel will register with the spline 6 with which the dowel portion 17 was originally engaged. Since the neck 25 is sufficiently small so that the spline will not be obstructed thereby, it will be evident that when the dowel portion 17 is thus displaced against the pressure of its spring, the inner and outer shaft elements may readily be separated axially, or readily re-engaged. Nevertheless with the dowel in the position shown in FIG. 2, the inner and outer shaft elements will be securely locked against axial separation.

It will be observed that all external fastening devices have been eliminated since the bore 16 is blind, being substantially closed at the end upon which the spring 18 seats. Retention of the dowel and spring in the blind bore is accomplished by the shoulder 22 on the dowel next to the push button, and the deformed retaining flange 20 which is abutted by the shoulder 22 when the coupling is disengaged.

The end of bore 16 is provided with a drive spin opening 28. This is for removal of the dowel from its bore. With the inner shaft removed from the tubular shaft element, a sharp blow on a drive pin engaged with the dowel through opening 28 will cam dowel shoulder 22 against the inwardly swaged shoulder 20 to flare out the shoulder 20 and enlarge the opening to release the dowel, as for replacement thereof, etc.

In the construction shown in FIG. 3, the inner shaft element 50 is polygonal in cross section, being square as illustrated. The opening 70 in the outer shaft element 80 is likewise square in cross section. Thus the non-circular contours of the mating portions of the inner and outer elements constrain them to rotate in unison.

Axial separation and replacement are controlled by dowel 17 having a reduced neck 25, a push button 23 and a compression spring 18 exactly in accordance with the previous disclosure. In this instance, the channel segments 120 intersect the corners 60 of the square section of the inner shaft element 50. The principle is identical to that disclosed above, the segments being cut through those portions of the inner shaft element which are of maximum radius so that when the dowel 17 is engaged in the appropriate channel segment of block 50 the parts are securely locked against separation.

I claim:

A coupling comprising a first shaft including a male portion having a non-circular cross section with parts of larger and smaller radius, said larger radius part having therein a recess with a partially cylindrical surface generated about a transverse axis, a second shaft having a socket releasably receiving said male portion of said first shaft, said socket having a non-circular cross section complementary to that of said male portion to afford common rotation when said male portion is received in said socket, said second shaft also having means defining a generally cylindrical blind end bore extending transversely of said socket in adjacently parallel relation to said transverse axis and intersecting said socket, said bore defining means integrally including, at the blind end thereof, a transverse end wall and, at the other end thereof, an inwardly turned part defining an entrance opening smaller than said bore, an axially symmetric dowel located and reciprocably movable in said bore, said dowel including, at one end thereof, proximate the blind end of the bore, a first annular portion having a diameter corresponding to that of said bore to guide reciprocal movement of said dowel in said bore, a portion tapering radially inwardly and away from said first annular portion, said tapering portion being adapted to be received in, and to engage, said recess to prevent withdrawal of said male portion from said socket, a reduced neck portion extending from the smaller end of said tapering portion, said neck portion having dimensions permitting insertion and withdrawal of said male portion relative to said socket when said neck portion is aligned with said first shaft element part of larger radius, a second annular portion extending from said neck portion having a diameter corresponding to that of said bore and to that of the said first annular portion and serving to guide reciprocal movement of said dowel in said bore, and a reduced diameter portion extending from said second annular portion to define a shoulder therebetween, said reduced diameter portion being smaller than said entrance opening to extend through said entrance opening, said shoulder being larger than said entrance opening whereby to abut the said inwardly turned part, a helical spring contained in said bore, said spring being seated against said transverse end wall at the blind end of the bore and against said one end of said dowel, whereby said dowel is normally urged outwardly away from the blind end of said bore through said opening to the extent permitted by either of engagement of said tapered portion with said recess so as to lock said first and second shafts and of engagement of said shoulder and said inturned part, and a drive pin opening in said end wall to admit a drive pin by which the dowel may be driven to flare out said inwardly turned part to enlarge said entrance opening to a size greater than that of said first and second portions for removal of the dowel from the bore.

References Cited by the Examiner

UNITED STATES PATENTS

| | | | |
|---|---|---|---|
| 1,121,962 | 12/1914 | Williston. | |
| 1,927,844 | 8/1933 | Pfauser | 287—119 |
| 2,190,081 | 2/1940 | Pfauser | 287—119 |
| 2,448,278 | 8/1948 | Ronning | 287—119 |
| 2,885,231 | 5/1959 | Smith | 287—119 |
| 2,926,034 | 2/1960 | Weaver | 287—53 |
| 3,070,390 | 12/1962 | Schroter et al. | |

CARL W. TOMLIN, *Primary Examiner.*